July 17, 1962 H. C. KAPPEL 3,044,922
METHOD OF MAKING MOLDED BEARINGS
Filed Oct. 12, 1959
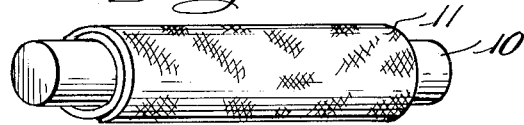
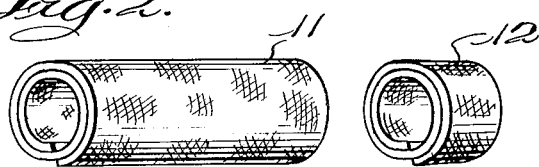
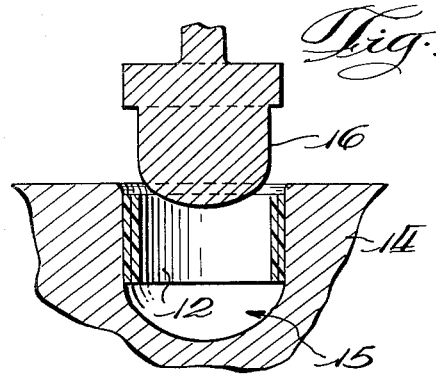
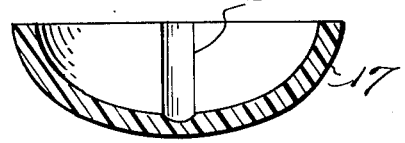
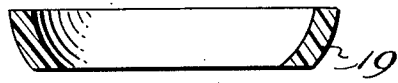
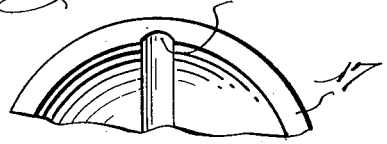
INVENTOR.
Harry C. Kappel
BY John L. Hutchinson
Attorney.

United States Patent Office 3,044,922
Patented July 17, 1962

3,044,922
METHOD OF MAKING MOLDED BEARINGS
Henry C. Kappel, Elmhurst, Ill., assignor to The Richardson Company, Melrose Park, Ill., a corporation of Ohio
Filed Oct. 12, 1959, Ser. No. 845,938
2 Claims. (Cl. 156—225)

This invention is concerned with molded bearings having improved properties and with a method of making such bearings involving a special molding technique using a resin-filler preform.

Bearings have been made from a variety of materials, for example, metals and plastics. Metal bearings are usually made by casting molten metal, sintering metal particles or machining a stock bar or slab. Plastic bearings are made by an appropriate plastic composition, generally comprising a resinous binder and a fibrous filler. Where relatively little pressure or force is contemplated in use, plastic bearings are suitable for many applications as compared to the more durable, but frequently more expensive, metal bearing. If, however, a bearing is to be subjected to relatively heavy duty use, many plastic bearings have been found to be inadequate in that they may unduly wear, lack sufficient physical strength or deform and, accordingly, have limited application for such uses.

One of the primary objects of this invention is to provide a molded plastic bearing made from a thermosetting resin-filler combination which has enhanced wear resistance, strength and shape retention and is capable of being used for relatively heavy duty applications.

Another object is to provide a method for making bearings of the foregoing type which enables such bearings to be economically manufactured in large quantities.

These and other objects will become more apparent from the specification hereinafter.

In the drawing:

FIGURE 1 is a perspective view demonstrating a preliminary operation for making a preform from which a bearing may be molded.

FIGURE 2 is a perspective view of a second operation for making the bearing preform.

FIGURE 3 is a fragmentary view, partly in cross-section, illustrating the molding technique used for forming a bearing.

FIGURE 4 is a side elevation, partly in cross-section, of one type of bearing made in accordance with the present invention.

FIGURE 5 is a fragmentary plan of the bearing of FIGURE 4.

FIGURE 6 is a side elevation, partly in cross-section, of a modified bearing which may be made in accordance with the present invention.

Bearings of the type contemplated herein are made by initially forming a cylindrical or tubular "preform" by circumferentially winding about a mandrel a filler sheet or web impregnated with a thermosetting resin. Preferably, the mandrel is heated to a moderate temperature to impart slight tackiness to the resin of the filler sheet to cause some adhesion of the convolutely wound laminae. Normally, the cylinder is made of sufficient size, such that it can be severed into smaller sections which serve as the actual preform. Frequently, the web is referred to as a "filler" in the molding or laminating art and will be so referred to at times herein.

Various thermosetting or heat-curable resins may be used to impregnate the filler, depending upon the particular type of a bearing desired and physical properties required. For most heavy duty applications, such as may occur in steering linkage, wheel suspension and torsion air suspension systems of vehicles, it has been found preferable, from both an economic and property standpoint, to use a phenolic resin to make bearings. This type of resin can be cured to a hard, infusible state, whereby the bearing will have a permanent, non-deformable shape.

The phenolic resins contemplated are made by condensation in an alkali medium of an aldehyde, such as formaldehyde, with a phenolic component, for example, phenol, cresols, xylenols or resorcinol. In general, phenolic resins may be initially condensed to a preliminary stage whereby they are soluble in ordinary solvents, such as alcohol, water or mixtures thereof. The partially condensed resin may be subsequently cured, as indicated above, by heat and pressure, as in a molding operation, to a hard, infusible and insoluble state.

A varnish for impregnating a filler is usually made by dissolving the phenolic resin, in its preliminary condensation stage, in a suitable solvent, such as the aforementioned water, alcohol or mixtures thereof. In practice, the filler is impregnated with resin by continuously withdrawing it from a supply roll and introducing it into a tank containing the resin varnish. After impregnation, the filler is normally passed through an oven wherein it is subjected to a drying operation, thereby removing volatiles and partially advancing the resin cure. The dried, impregnated filler may then be used to make preforms as hereinafter described.

In order to obtain the enhanced physical properties available in bearings made in accordance with the method contemplated herein, particularly for bearings which are to be used in mechanical systems as specified above, it has been found preferable to use a woven web or filler derived from cellulosic fibers, such as duck or canvas cloth. Synthetic fibers or strands may, likewise, be used to make a web where special properties are required and the additional expense, if any, justified. Thus, webs may be made from nylon, rayon and analogous synthetic fibers or strands as well as glass or asbestos fibers or strands.

The thermosetting resin varnish employed to impregnate the filler preferably includes a lubricant, such as graphite or molybdenum sulfide, usually in particle form and in sufficient quantities so as to provide a self-lubricating bearing surface in the finished bearing.

As indicated, the present process contemplates the formation of a preform for insertion into the cavity of a mold. The aforementioned filler, containing a partially condensed thermosetting resin, is wrapped circumferentially around a mandrel, such as mandrel 10 of FIGURE 1 to form a tube or elongated cylinder 11. Normally, several turns are made, resulting in a plurality of convolutely wound laminae, for the purpose of obtaining desired strength in the final bearing and to provide sufficient material for molding to predetermined dimensions. The mandrel is preferably heated so as to slightly advance the cure of the resin or render it tacky and thereby cause some adhesion of the convolutely wound laminae of the cylinder 11. Where phenolic resins are used, the mandrel may be heated to a temperature of the order of 130–150° F. without appreciably effecting the cure of the resin, while providing sufficient heat to partially adhere the laminae of the cylinder 11, thereby enabling its subsequent handling as a substantially self-sustaining unit.

While from a commercial viewpoint it is more practical to use a single sheet of resin-impregnated filler and wrap the sheet several times around the mandrel to obtain a desired thickness, it can be appreciated that a cylindrical preform may be made by convolutely wrapping several independent resin-impregnated sheets around the mandrel to achieve the required build-up.

After formation, the cylinder 11 is removed from the mandrel and severed into smaller cylindrical sections, such as cylindrical section 12, to make the required preform whose length should be predetermined in accordance with the size of the mold cavity into which it will be inserted and, correspondingly, the bearing to be formed. In general, the circumferential dimensions of the cylinder 11 will approximate the maximum corresponding dimensions of the finished bearing.

The cylindrical preform 12 is inserted into the cavity 15 of mold 14 in the manner shown in FIGURE 3. The mold is then closed by moving the core 16 into the cavity 15 under pressure, the mold 14 and, if necessary, the core 16, being heated to a temperature which will set or cure the resin. When using phenolic resins, temperatures of between about 300–350° F. are generally required to obtain a hard, infusible state. As can be seen from FIGURE 3, the core 16 exerts initial pressure longitudinally downward from the upper edges of the cylindrical preform. Continued downward movement of the core on the preform causes the lower portions of the preform to move radially inward and eventually forces at least a portion of the preform 12 to take the general shape of the bottom of the mold cavity 15 and the corresponding outer surfaces of the core 16. A particular application for bearings made in accordance with the above procedure is in ball joint assemblies which frequently form a part of the aforementioned steering linkage, wheel suspension or torsion air suspension systems.

An exemplary bearing, which may be made using this technique, is shown in FIGURE 4 wherein the bearing is characterized by having a hollow, generally semispherical shape. An alternate type of bearing which may be made using the same principle, but with a modified mold cavity, is the circular concave structure of FIGURE 6, which, in effect, may be considered as a section of a sphere and is adaptable to partially encase a ball joint.

The molding operation forces the preform into the desired shape while maintaining the basic strength inherent in the use of a web and particularly a plurality of laminae of a woven fabric or cloth. Accordingly, bearings made as contemplated herein have been found to have enhanced strength and capable of being used in applications not suitable for many plastic bearings made from resin systems alone or combined with particulate or macerated fillers.

Generally, it is contemplated that the impregnating resin employed to impregnate the filler will contain a lubricant, whereby the finished bearing will have self-lubricating properties. It may be necessary to provide a means for additional lubrication at the wearing surface of the bearing. Accordingly, recesses may be formed, when desired, in the bearing surface during the molding operation, such as recesses 18. These recesses may be filled with grease or similar lubricant when required.

In my copending application, Serial No. 793,806, filed February 17, 1959, I have disclosed and claimed a laminated type bearing provided with a special low friction coating applied to the bearing surface thereof. Bearings of this type may, in some instances, be made in accordance with the technique disclosed herein.

Although the method disclosed herein is particularly suitable for the manufacture of bearings, it will be understood that the same principles may also be employed to make various molded articles, housings or the like.

Having disclosed the invention and certain exemplary embodiments thereof, the same is only intended to be limited by the scope of the following claims.

I claim:
1. A method of making a molded bearing which comprises impregnating a woven cellulosic fiber web with a thermosetting resin, convolutely winding said web around a heated mandrel to partially advance the cure of said resin and to form a self-sustaining cylinder composed of a plurality of adhesively united laminae, said cylinder having a circumference approximating the maximum lateral dimensions of said bearing, severing said cylinder into smaller cylindrical sections of a size sufficient to fill the cavity of the bearing mold and subjecting such a section to a molding operation under heat and pressure whereby at least a portion of the sides of said smaller cylindrical section are deformed radially inward of its longitudinal axis forming a circular concave configuration and said thermosetting resin is simultaneously cured to a hard, infusible state.

2. A method of making a molded bearing as described in claim 1 wherein the thermosetting resin is the condensation product of an aldehyde with a member of the class consisting of phenol, cresols, xylenols and resorcinol.

References Cited in the file of this patent
UNITED STATES PATENTS

| | | |
|---|---|---|
| 1,205,345 | Hatfield | Nov. 21, 1916 |
| 1,409,148 | Apple | Mar. 14, 1922 |
| 2,001,977 | Riddell | May 21, 1935 |
| 2,013,747 | Dunlap | Sept. 10, 1935 |
| 2,757,109 | Martello | July 31, 1956 |
| 2,835,521 | White | May 20, 1958 |
| 2,885,248 | White | May 5, 1959 |

FOREIGN PATENTS

| | | |
|---|---|---|
| 88,212 | Austria | Apr. 25, 1922 |